United States Patent
Kim et al.

(10) Patent No.: US 12,158,361 B2
(45) Date of Patent: Dec. 3, 2024

(54) TRANSFORMER-BASED ANOMALY DETECTION APPARATUS AND METHOD THEREFOR

(71) Applicant: INDUSTRY ACADEMY COOPERATION FOUNDATION OF SEJONG UNIVERSITY, Seoul (KR)

(72) Inventors: Yong Guk Kim, Seongnam-si (KR); Viet Tuan Le, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 147 days.

(21) Appl. No.: 18/172,435

(22) Filed: Feb. 22, 2023

(65) Prior Publication Data
US 2024/0167852 A1    May 23, 2024

(30) Foreign Application Priority Data

Nov. 15, 2022 (KR) .......................... 10-2022-0152138

(51) Int. Cl.
*G01D 5/20*        (2006.01)
(52) U.S. Cl.
CPC ....................................... *G01D 5/20* (2013.01)

(58) Field of Classification Search
CPC ............ B60W 2420/506; G06K 7/082; H05K 2201/086; Y10S 336/00; Y10S 505/87
See application file for complete search history.

(56) References Cited

U.S. PATENT DOCUMENTS

2007/0058719 A1*   3/2007   Date ...................... H04N 19/61
                                                          375/E7.211
2021/0201042 A1*   7/2021   Kim ....................... G06N 3/044

\* cited by examiner

*Primary Examiner* — Tung X Nguyen

(57) ABSTRACT

A transformer-based anomaly detection apparatus includes: an encoder unit including n encoding blocks having a pyramid structure, and extracting respective multi-scale feature maps having the pyramid structure through respective encoding blocks; a spatio-temporal transformer unit having n spatio-temporal transformers, and generating each multi-scale spatio-temporal attention map in which a temporal feature and a spatial feature for the feature map extracted from each encoding block are emphasized through each spatio-temporal transformer; and a decoder unit including n decoders having a reverse pyramid structure, and generating a prediction frame by using outputs of the multi-scale spatio-temporal attention map and a previous layer decoder through n decoders, and an abnormal event is detected by using the prediction frame.

9 Claims, 11 Drawing Sheets

FIG.7

| Method | Ped2 | Avenue | ShanghaiTech |
|---|---|---|---|
| Yuan et al. [12] (2021) | 96.4 | 87.0 | - |
| Cai et al. [29] (2021) | 96.6 | 86.6 | 73.7 |
| Cai et al. [16] (2021) | 96.8 | 87.4 | 74.2 |
| Deepak et al. [2] (2021) | 83.0 | 82.0 | - |
| Luo et al. [24] (2021) | - | 87.3 | 74.1 |
| Wu et al. [21] (2021) | 92.4 | - | - |
| Luo et al. [5] (2021) | 96.2 | 85.7 | 73.0 |
| Yang et al. [3] (2021) | 93.7 | 83.2 | - |
| Yang et al. [17] (2021) | 96.3 | 86.0 | 73.6 |
| Wang et al. [33] (2021) | 96.0 | 86.3 | 74.5 |
| Doshi et al. [31] (2021) | 97.2 | 86.4 | 70.9 |
| Szymanowicz et al. [22] (2021) | 84.4 | 75.3 | 70.4 |
| Qiang et al. [23] (2021) | 97.1 | 85.8 | 73.7 |
| Massoli et al. [63] (2021) | - | - | 73.0 |
| Wang et al. [64] (2021) | 96.2 | - | 72.5 |
| Xu et al. [65] (2021) | 96.7 | 85.8 | - |
| Saypadith et al. [66] (2021) | 95.7 | 86.8 | 73.0 |
| Liu et al. [67] (2021) | 93.6 | 85.4 | - |
| Hao et al. [7] (2022) | 96.9 | 86.6 | 73.8 |
| Chang et al. [28] (2022) | 96.7 | 87.1 | 73.7 |
| Li et al. [30] (2022) | 96.3 | 87.1 | 73.6 |
| Guo et al. [20] (2022) | 88.1 | 86.6 | - |
| Liu et al. [6] (2022) | 96.6 | 86.5 | - |
| Wang et al. [34] (2022) | 89.6 | 84.6 | 70.2 |
| Li et al. [10] (2022) | 95.4 | 86.0 | 71.4 |
| Borja et al. [32] (2022) | 95.0 | 83.9 | - |
| Zou et al. [68] (2022) | 97.3 | 87.2 | 72.7 |
| Gu et al. [9] (2022) | 94.9 | 84.9 | - |
| Park et al. [18] (2022) | 96.3 | 85.3 | 72.2 |
| Doshi et al. [35] (2022) | 95.6 | 86.4 | 70.1 |
| Zhang et al. [11] (2022) | 95.8 | 84.9 | 71.4 |
| Ours | 97.3 | 87.8 | 74.9 |

(a) Highway.

(b) Crossroads.

(c) Bike roundabout.

(d) Vehicle roundabout.

(e) Railway inspection.

(f) Solar panel inspection.

(g) Farmland inspection.

FIG. 10

| Scene | Skip-GAN | ANDT | Ours |
|---|---|---|---|
| Highway | 64.8 | 68.7 | 70.6 |
| Crossroads | 59.3 | 65.2 | 53.5 |
| Bike roundabout | 77.7 | 82.2 | 82.7 |
| Vehicle roundabout | 58.5 | 61.3 | 65.6 |
| Railway inspection | 65.8 | 59.4 | 67.8 |
| Solar panel inspection | 65.7 | 64.2 | 67.7 |
| Farmland inspection | 71.7 | 79.5 | 60.8 |

TRANSFORMER-BASED ANOMALY DETECTION APPARATUS AND METHOD THEREFOR

CROSS-REFERENCE TO RELATED APPLICATION

This application claims under 35 U.S.C. § 119(a) the benefit of Korean Patent Application No. 10-2022-0152138 filed on Nov. 15, 2022, the entire contents of which are incorporated herein by reference.

BACKGROUND

(a) Technical Field

The present invention relates to a transformer-based anomaly detection apparatus and an apparatus therefor.

(b) Background Art

Surveillance cameras are installed in various places to play a very useful role in recording situations and analyzing and preventing unexpected events. However, it is inefficient for a person to monitor every moment or to analyze numerous surveillance images to find an event. Therefore, various studies to detect an anomaly in surveillance camera images are actively underway in deep learning fields.

However, conventional deep learning technology based on anomaly detection technology has a disadvantage that does not properly reflect temporal characteristics.

SUMMARY OF THE DISCLOSURE

The present disclosure has been made in an effort to provide a transformer-based anomaly detection apparatus and an apparatus therefor.

The present disclosure has also been made in an effort to provide a transformer-based anomaly detection apparatus and an apparatus therefor capable of extracting a multi-scale feature map by utilizing a transformer as an encoder in order to reflect long-range dependency.

The present disclosure has also been made in an effort to provide a transformer-based anomaly detection apparatus and an apparatus therefor capable of utilizing features of a spatial region and a temporal region of a multi-scale feature map, and capable of frame prediction by reflecting the utilized features.

An exemplary embodiment of present disclosure provides a transformer-based anomaly detection apparatus.

According to an exemplary embodiment of the present disclosure, an anomaly detection apparatus may be provided which includes: an encoder unit including n encoding blocks having a pyramid structure, and extracting respective multi-scale feature maps having the pyramid structure through respective encoding blocks; a spatio-temporal transformer unit having n spatio-temporal transformers, and generating each multi-scale spatio-temporal attention map in which a temporal feature and a spatial feature for the feature map extracted from each encoding block are emphasized through each spatio-temporal transformer; and a decoder unit including n decoders having a reverse pyramid structure, and generating a prediction frame by using outputs of the multi-scale spatio-temporal attention map and a previous layer decoder through n decoders, in which an abnormal event is detected by using the prediction frame.

The n-th decoder may combine a result of upsampling the decoder output of the previous layer and a n-th spatio-temporal attention map output from the n-th spatio-temporal transformer, and then apply a convolution layer.

The n-th transformer may include a temporal self-attention module receiving the n-th feature map output from the n-th encoder, and then comparing patches having the same spatial location in different frames to generate a temporal attention map; and a spatial self-attention module positioned at a rear end of the temporal self-attention module, and generating a spatial attention map by using an output of the temporal self-attention module, and the temporal attention map and the spatial attention map may be added to generate the n-th spatio-temporal attention map.

The spatial self-attention module may apply a spatial reduction by using a spatial-reduction layer before applying a spatial self-attention.

The n-th spatio-temporal attention map may be transferred to the decoder through a feed-forward network module, and a layer norm (LN) is applied to the n-th spatio-temporal attention map, which may be transferred to the feed-forward network module.

Another exemplary embodiment of the present disclosure provides a transformer-based anomaly detection method.

According to another exemplary embodiment of the present disclosure, an anomaly detection method may be provided which includes: (a) including n encoding blocks having a pyramid structure, and extracting respective multi-scale feature maps having the pyramid structure through respective encoding blocks; (b) having n spatio-temporal transformers, and generating each multi-scale spatio-temporal attention map in which a temporal feature and a spatial feature for the feature map extracted from each encoding block are emphasized through each spatio-temporal transformer; and (c) including n decoders having a reverse pyramid structure, and generating a prediction frame by using outputs of the multi-scale spatio-temporal attention map and a previous layer decoder through n decoders; and calculating a score by using the prediction frame, and determining that there is an abnormal event when the score is equal to or more than a threshold value.

The n-th decoder may combine a result of upsampling the decoder output of the previous layer and a n-th spatio-temporal attention map output from the n-th spatio-temporal transformer, and then apply a convolution layer.

The generating of the n-th spatio-temporal attention map may include receiving the n-th feature map output from the n-th encoder, and then comparing patches having the same spatial location in different frames to generate a temporal attention map; and being positioned at a rear end of the temporal self-attention module, and generating a spatial attention map by using an output of the temporal self-attention module; and generating the n-th spatio-temporal attention map by adding the temporal attention map and the spatial attention map.

According to an exemplary embodiment of the present disclosure, a transformer-based anomaly detection apparatus and an apparatus therefor are provided to be capable of extracting a multi-scale feature map by utilizing a transformer as an encoder in order to reflect long-range dependency.

Further, there is an advantage of being capable of utilizing features of a spatial region and a temporal region of a multi-scale feature map, and capable of frame prediction by reflecting the utilized features.

BRIEF DESCRIPTION OF THE DRAWINGS

FIG. 7 is a diagram illustrating a comparison of Area Under the Curve (AUC) curve results in the related art and an exemplary embodiment of the present disclosure.

FIG. 10 is a diagram illustrating a comparison result of the AUC curve results in the related art and an exemplary embodiment of the present disclosure according to FIG. 8.

DETAILED DESCRIPTION

A singular form used in the present disclosure may include a plural form if there is no clearly opposite meaning in the context. In this application, the term such as "comprising" or "including" used in the specification should not be interpreted as necessarily including all various components or various steps disclosed in the present disclosure, and it should be interpreted that some component or some steps among them may not be included or additional components or steps may be further included. In addition, terms including "part", "module", and the like disclosed in the specification mean a unit that processes at least one function or operation and this may be implemented by hardware or software or a combination of hardware and software.

Hereinafter, exemplary embodiments of the present disclosure will be described in detail with reference to the accompanying drawings.

Figure 1:
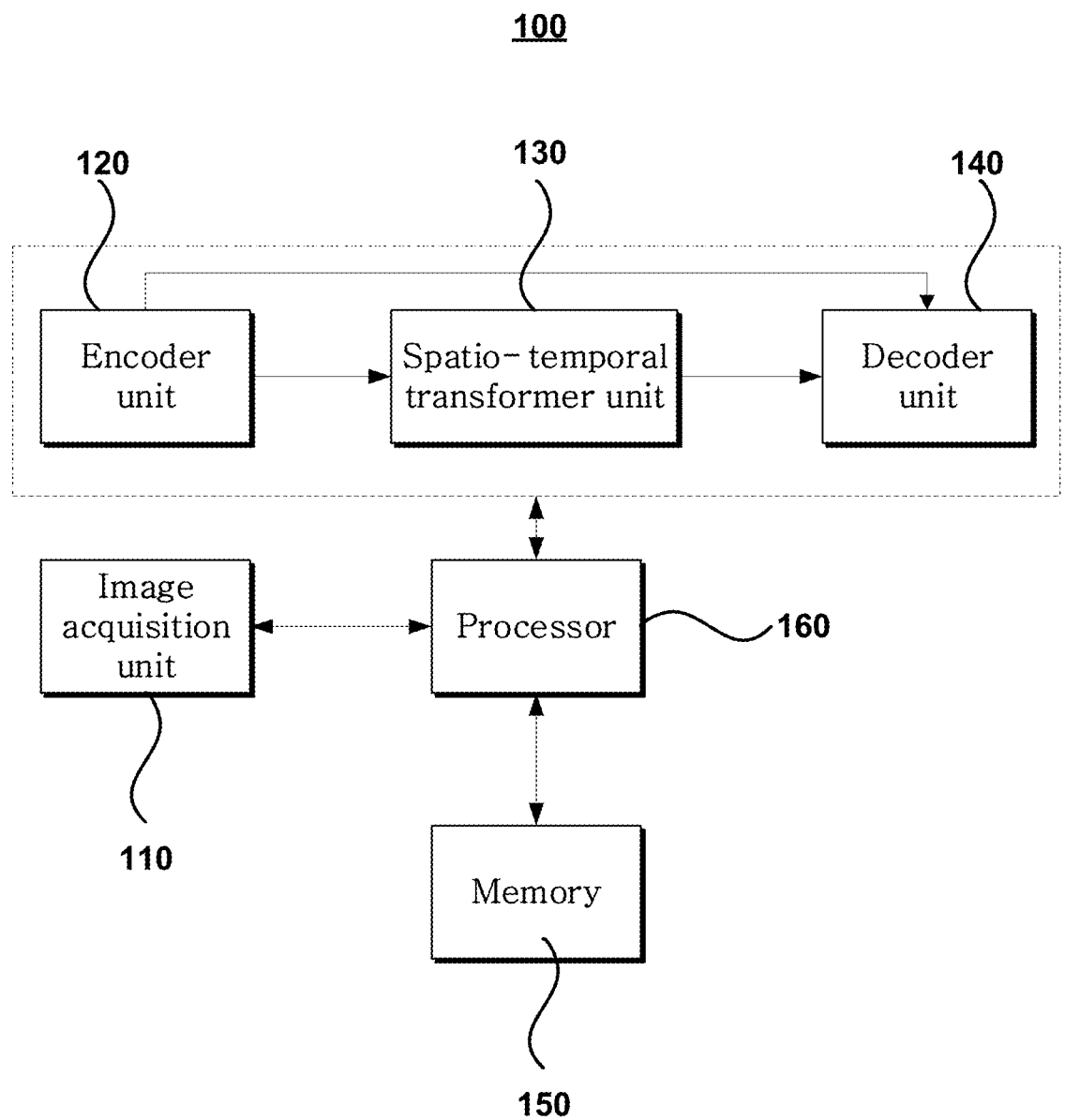
FIG. 1 is a diagram schematically illustrating a configuration of a transformer-based anomaly detection apparatus according to an exemplary embodiment of the present disclosure.
Figure 2:
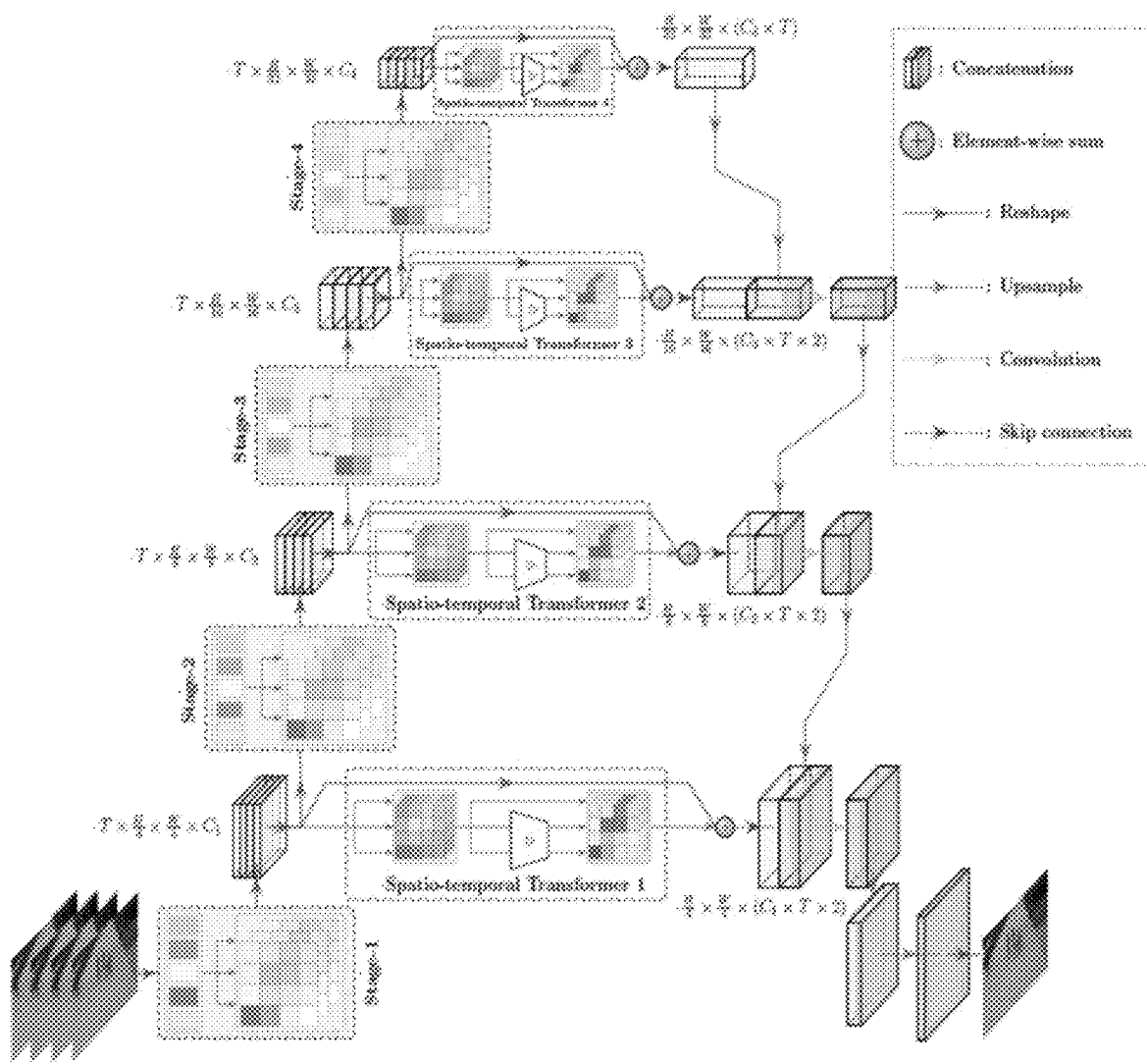
FIG. 2 is a diagram illustrating a transformer-based auto encoder model according to an exemplary embodiment of the present disclosure.
Figure 3:
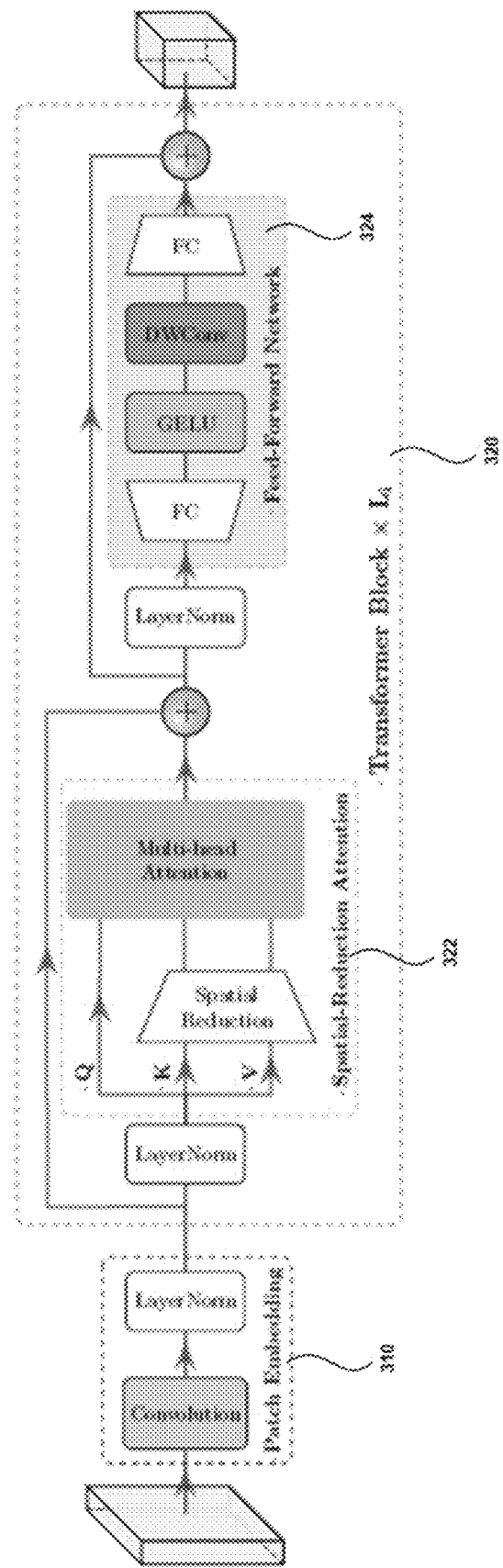
FIG. 3 is a diagram illustrating a detailed structure of an encoding block according to an exemplary embodiment of the present disclosure.
Figure 4:
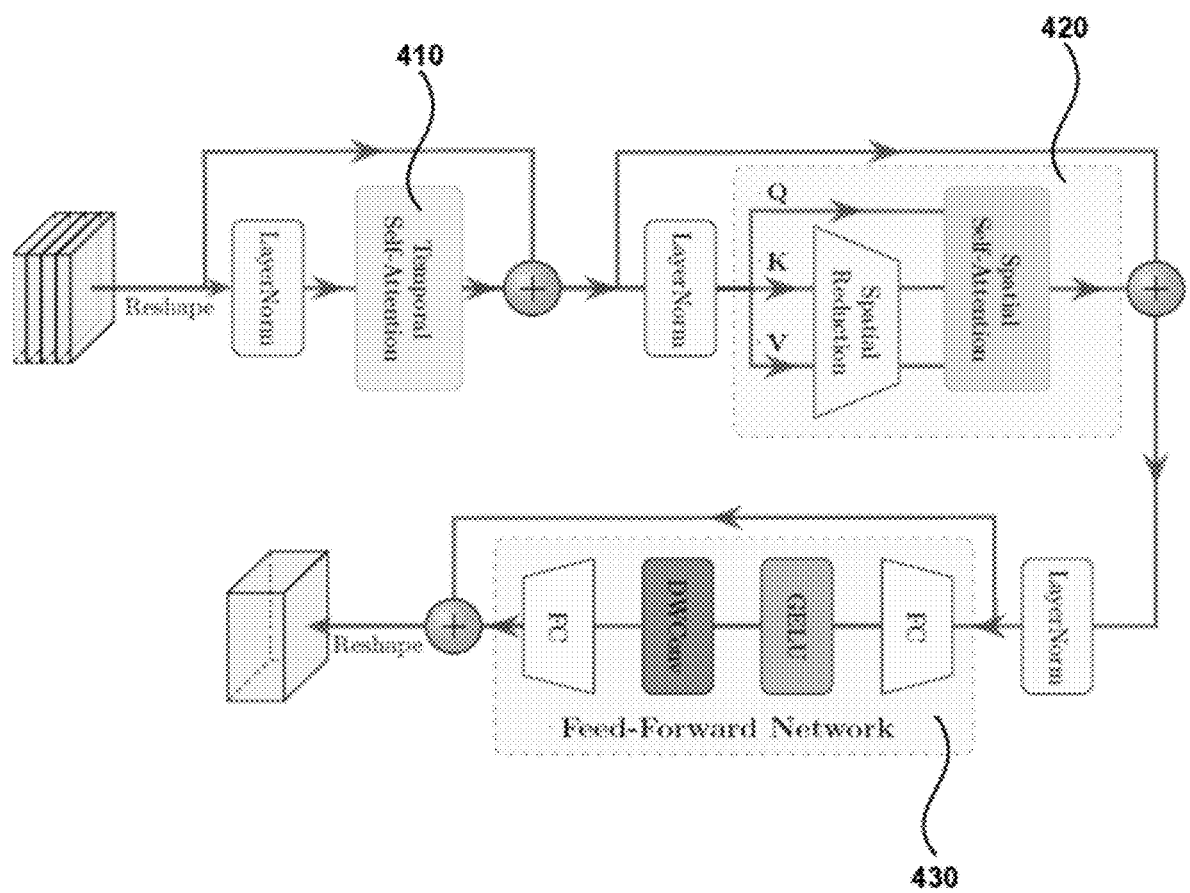
FIG. 4 is a diagram illustrating a structure of a spatio-temporal transformer according to an exemplary embodiment of the present disclosure.

FIG. 1 is a diagram schematically illustrating a configuration of a transformer-based anomaly detection apparatus according to an exemplary embodiment of the present disclosure, FIG. 2 is a diagram illustrating a transformer-based auto encoder model according to an exemplary embodiment of the present disclosure, FIG. 3 is a diagram illustrating a detailed structure of an encoding block according to an exemplary embodiment of the present disclosure, and FIG. 4 is a diagram illustrating a structure of a spatio-temporal transformer according to an exemplary embodiment of the present disclosure.

Referring to FIG. 1, a transformer-based anomaly detection apparatus 100 according to an exemplary embodiment of the present disclosure is configured to include an image acquisition unit 110, an encoder unit 120, a spatio-temporal transformer unit 130, a decoder unit 140, a memory 150, and a processor 160.

The image acquisition unit 110 is a means for acquiring a surveillance camera image.

The encoder unit 120 is a means for extracting a multi-scale feature map having a different resolution for the surveillance camera image acquired through the image acquisition unit 110.

The encoder unit 120 may include n encoding blocks having a pyramid structure, and extract a multi-scale feature map for a frame through n encoding blocks. The structure of the encoder unit 120 is illustrated in FIG. 2. That is, the encoder unit 120 is constituted by n encoding blocks having an upward hierarchy. Each encoding block may extract each feature map having a different resolution by performing a convolutional operation for the features maps the surveillance camera image or/and a previous encoding block.

In FIG. 3, a detailed structure of each encoding block is illustrated. Referring to FIG. 3, an operation of each encoding block will be described in brief.

Referring to FIG. 3, each encoding block includes each of a patch embedding unit 310 and a transformer block 320.

The patch embedding unit 310 may generate embedding patches having a size of $$\frac{H}{S} \times \frac{W}{S} \times C_1$$

by applying a convolution having a stride of S to an input frame having a size of H×W×3.

The transformer block 320 may extract the feature map by using the embedding patches output from the patch embedding unit 310.

For example, a first encoding block may generate a feature map $F_1$ having a size of $$\frac{H}{4} \times \frac{W}{4} \times C_1$$

by using embedding patches having a size of $$\frac{H}{S} \times \frac{W}{S} \times C_1.$$

Similarly, feature maps $F_2$, $F_3$, and $F_4$ of a second encoding block, a third encoding block, and a fourth encoding block may be generated by receiving an output of a previous encoding block.

As illustrated in FIG. 3, each transformer block 320 is constituted by a spatial-reduction attention block 322 and a feed-forward network block 324.

The embedding patches may be normalized through a layer norm (LN) block before being applied to the spatial-reduction attention block 322 and the feed-forward network block 324. That is, the embedding patches may normalize each of channels of the embedding patch by the LN block.

The embedding patches may pass through the spatial-reduction attention block 322 and the feed-forward network block 324 after passing through the LN block.

Respective outputs may be shown as in Equations 1 and 2.

$$z_l = SRA(LN(z^{l-1})) + z^{l-1} \quad \text{[Equation 1]}$$

$$z^{l+1} = FFN(LN(z_l)) + z_l \quad \text{[Equation 2]}$$

Here, $z^l$ and $z^{l+1}$ represent an output of the spatial-reduction attention block and an output of the feed-forward network block, respectively.

The spatial-reduction attention block 322 may reduce a calculation of an attention mechanism by applying a convolution to a key K and a value V in order to reduce a spatial scale. An attention operation may be calculated as in Equation 3.

$$\text{Attention}(q, k, v) = \text{Softmax}\left(\frac{qk^T}{\sqrt{d_{head}}}\right)v \quad \text{[Equation 3]}$$

The feed-forward network block 324 is constituted by two linear layers, and a depth-wise convolution and a GELU activation function are added between two linear layers.

The spatio-temporal transformer unit 130 is a means for generating a spatio-temporal attention map in which features of a temporal region and a spatial region are emphasized by receiving a feature map which is an output of the encoder unit 120. The spatio-temporal transformer unit 130 has a plurality of spatio-temporal transformers, and analyzes the feature map which is the output of each encoding module to generate a multi-scale spatio-temporal attention map.

The configuration of each spatio-temporal transformer is illustrated in FIG. 4.

Referring to FIG. 4, the spatio-temporal transformer may receive the feature map which is the output of each encoding module, and apply a temporal self-attention block 420 to a result of applying a temporal self-attention block 410 to the corresponding feature map. Through this, the spatio-temporal attention map in which the features of the temporal region and the spatial region are emphasized may generated through the feature map output from each encoding module.

Since the spatio-temporal transformer calculates a self attention by using all S spatial locations and T temporal locations, the spatio-temporal transformer has a complexity of $O(T^2S^2)$.

That is, this is represented as in Equation 4.

$$z_{s,t}^l = \sum_{t'=0}^{T-1}\sum_{s'=0}^{S-1} \text{Softmax}\left(\frac{q_{s,t}^l \cdot k_{s',t'}^l}{\sqrt{D_{head}}}\right)v_{s',t'}^l, \begin{cases} s = 0, \ldots, S-1 \\ t = 0, \ldots, T-1 \end{cases} \quad \text{[Equation 4]}$$

Here, Softmax represents a Softmax activation function.

In order to reduce a calculation complexity of the spatio-temporal attention, a temporal attention and a spatial attention are respectively separated and applied, and when this is represented by the equation, this may be represented as in Equation 5.

$$z_{s,t}^l = \sum_{t'=0}^{T-1} \text{Softmax}\left(\frac{q_{s,t}^l \cdot k_{s,t'}^l}{\sqrt{D_{head}}}\right)v_{s,t'}^l, \begin{cases} s = 0, \ldots, S-1 \\ t = 0, \ldots, T-1 \end{cases} \quad \text{[Equation 5]}$$

$$z_{s,t}^l = \sum_{s'=0}^{S-1} \text{Softmax}\left(\frac{\tilde{q}_{s,t}^l \cdot \tilde{k}_{s',t}^l}{\sqrt{D_{head}}}\right)\tilde{v}_{s',t}^l, \begin{cases} s = 0, \ldots, S-1 \\ t = 0, \ldots, T-1 \end{cases}$$

Here, $\tilde{q}_{s,t}^l, \tilde{k}_{s',t}^l, \tilde{v}_{s',t}^l$ may be each calculated from $\tilde{z}_{s,t}^l$. The separated spatio-temporal attention may reduce the calculation complexity from $O(T^2S^2)$ to $O(T^2S+TS^2)$.

Therefore, according to an exemplary embodiment of the present disclosure, the spatio-temporal transformer receives a feature map which is an output of an n-th encoding block, and then compares patches having the same spatial location in different frames through the temporal self-attention module to generate a temporal attention map.

The temporal attention map which is the output of the temporal self-attention module is input into the spatial attention module to generate the spatio-temporal attention map. Since the spatio-temporal transformer is applied after each encoding block, the self attention may be calculated by using feature maps having different resolutions. Therefore, in an exemplary embodiment of the present disclosure, a spatial reduction layer is applied before applying the spatial attention module. A spatial scale of the key K and the value V may be reduced by the spatial reduction layer before being applied to the spatial self-attention module.

A calculation cost of the spatial self-attention module may be significantly reduced by reducing the spatial scale of K and V.

Each of the temporal self attention and the spatial self attention may be calculated as in Equation 6.

$$z_{s,t}^l = \sum_{t'=0}^{T-1} \text{Softmax}\left(\frac{q_{s,t}^l \cdot k_{s,t'}^l}{\sqrt{D_{head}}}\right)v_{s,t'}^l, \begin{cases} s = 0, \ldots, S-1 \\ t = 0, \ldots, T-1 \end{cases} \quad \text{[Equation 6]}$$

$$z_{s,t}^l = \sum_{s'=0}^{S-1} \text{Softmax}\left(\frac{\tilde{q}_{s,t}^l \cdot \tilde{k}_{s',t}^l}{\sqrt{D_{head}}}\right)\tilde{v}_{s',t}^l, \begin{cases} s = 0, \ldots, S-1 \\ t = 0, \ldots, T-1 \end{cases}$$

Here, $\tilde{q}_{s,t}^l$ is derived from $\tilde{z}_{s,t}^l$, and $\ddot{k}_{s',t}^l$ and $\hat{v}_{s',t}^l$ are calculated from $\tilde{z}_{s,t}^l$. Thereafter, the spatial scale is reduced by the spatial reduction layer.

Thereafter, $\tilde{z}_{s,t}^l$ is transferred to the feed-forward network block 430 in order to acquire a final encoding result.

A fully connected layer increases a feature dimension of an input vector, and a GELU function is used as an activation function after a first fully connected layer. Further, as illustrated in FIG. 4, a depth-wise convolution block is added to the feed-forward network block 430 in order to utilize a local context. A second fully connected layer may reduce a channel to coincide with a size of an input channel.

Referring back to FIG. 1, the decoder unit 140 has a plurality of decoding blocks having a reverse pyramid structure, and generates a restoration image by using outputs of the multi-scale feature map or/and the multi-scale spatio-temporal attention map and a previous decoding block.

As illustrated in FIG. 2, a multi-scale feature map of another layer is transferred to a decoder through a skipping connection in order to restore a spatial resolution of the feature map. That is, a deconvolution layer is applied to a feature map of a previous step, which is upsampled, and then combined with the spatio-temporal attention map which is the output of the spatio-temporal transformer. The combined feature map may be transferred a convolution layer constituted by a 3×3 convolution, a batch normalization, and the RELU activation function.

An object function for a network model according to an exemplary embodiment of the present disclosure will be described. For example, it is assumed that a sequence of an input frame is the same as $\{I_1, I_2, \ldots, I_t\}$.

The model according to an exemplary embodiment of the present disclosure aims at predicting a prediction frame $\hat{I}_{t+1}$ corresponding to an actual frame $I_{t+1}$. Three different loss functions are used in order to make the prediction frame $\hat{I}_{t+1}$ and the actual frame $I_{t+1}$ be similar.

In order to ensure the similarity of all pixels in an RGB space, a loss $l_2$ is applied between the prediction frame $\hat{I}_{t+1}$ and the actual frame $I_{t+1}$ as shown in Equation 7.

$$L_{int}(I,\hat{I}) = \|I - \hat{I}\|_2^2 \quad \text{[Equation 7]}$$

However, when the loss $l_2$ is used, there is a disadvantage that the output is blurred. Therefore, an additional slope loss is used in order to acquire a clearer prediction frame. A slope loss function calculates a slope an absolute slope and a correct answer according to two spatial dimensions of a predicted frame as in Equation 8.

$$L_{gra}(I, \hat{I}) = \sum_{i,j} \left\| |\hat{I}_{i,j} - \hat{I}_{i-1,j}| - |I_{i,j} - I_{i-1,j}| \right\|_1 + \quad \text{[Equation 8]}$$

$$\left\| |\hat{I}_{i,j} - \hat{I}_{i,j-1}| - |I_{i,j} - I_{i,j-1}| \right\|_1$$

Further, a structural difference is measured by using multi-scale structural similarity (MS-SSIM). The MS-SSIM is estimated as a structural similarity of images in different resolutions. Therefore, a final loss is calculated by a strength loss $L_{int}$, a slope loss $L_{gra}$, and a multi-scale structural loss $L_{mss}$.

$$L_{pre}(I,\hat{I}) = \alpha L_{int}(I,\hat{I}) + \beta L_{gra}(I,\hat{I}) + \gamma L_{mss}(I,\hat{I}) \quad \text{[Equation 9]}$$

Here, $\alpha$, $\beta$, and $\gamma$ represent coefficients that maintain a weight balance of the loss function.

The memory 150 stores a program code for performing a transformer-based anomaly detection method according to an exemplary embodiment of the present disclosure.

The processor 160 is a means for controlling internal components (e.g., the image acquisition unit 110, the encoder unit 120, the spatio-temporal transformer unit 130, the decoder unit 140, and the memory 150) of the anomaly detection apparatus 100 according to an exemplary embodiment of the present disclosure.

Further, the processor 160 may detect an abnormal event by using the prediction frame. This will be described in more detail.

Since the encoder unit 120 the spatio-temporal transformer unit 130, and the decoder unit 140 according to an exemplary embodiment of the present disclosure are learned as a normal event, the encoder unit 120 the spatio-temporal transformer unit 130, and the decoder unit 140 well predict the normal event. With respect to a score difference between the prediction frame and the actual frame, a difference between the prediction frame and the actual frame of the abnormal event is large, or vice versa.

A peak signal-to-noise ratio (PSNR) is used for estimating an image quality, and the larger a PSNR value, the higher the quality of the frame. That is, when the PSNR value of the predicted frame is high, the difference between the predicted frame and the actual frame is small. Consequently, there is a high possibility that such a case will be the normal event.

The PSNR may be calculated by using Equation 10.

$$PSNR(I, \hat{I}) = 10\log_{10} \frac{[\max_{\hat{I}}]^2}{\frac{1}{N}\sum_{i=1}^{N}(I_i - \hat{I}_i)^2} \quad \text{[Equation 10]}$$

Here, N represents the number of pixels of the frame, and [$\max_{\hat{I}}$] represents a maximum value of the prediction frame $\hat{I}$.

PSNR values of all frames may be normalized to a range [0, 1], and then an abnormal score of the frame may be calculated by using Equation 11.

$$S(t) = \frac{PSNR_t - \min(PSNR)}{\max(PSNR) - \min(PSNR)} \quad \text{[Equation 11]}$$

Here, min(PSNR) represents a minimum PSNR value of a frame sequence, and max(PSNR) represents a maximum PSNR value of the frame sequence.

The abnormal score is used for estimating whether the frame is normal or abnormal as a given threshold value.

Figure 5:
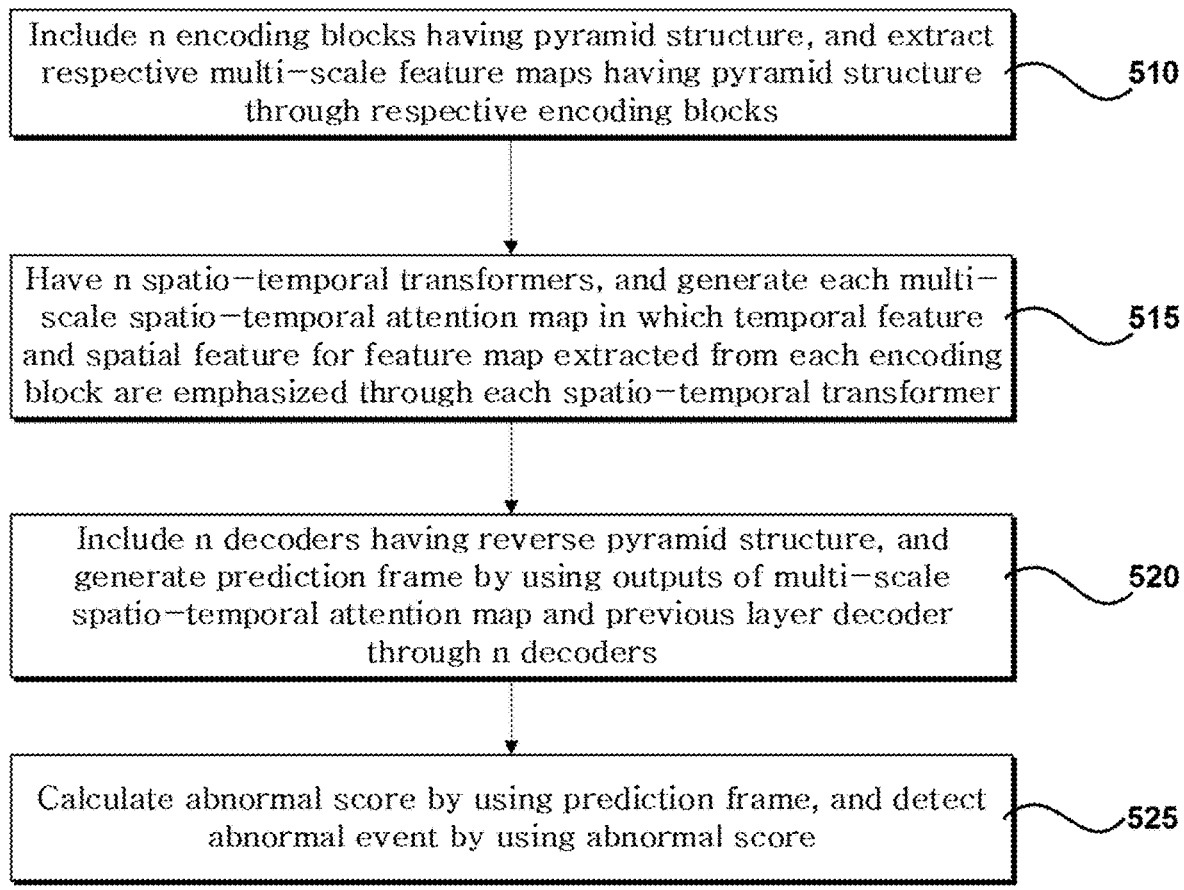
FIG. 5 is a flowchart illustrating a transformer-based anomaly detection method according to an exemplary embodiment of the present disclosure.
Figure 6:
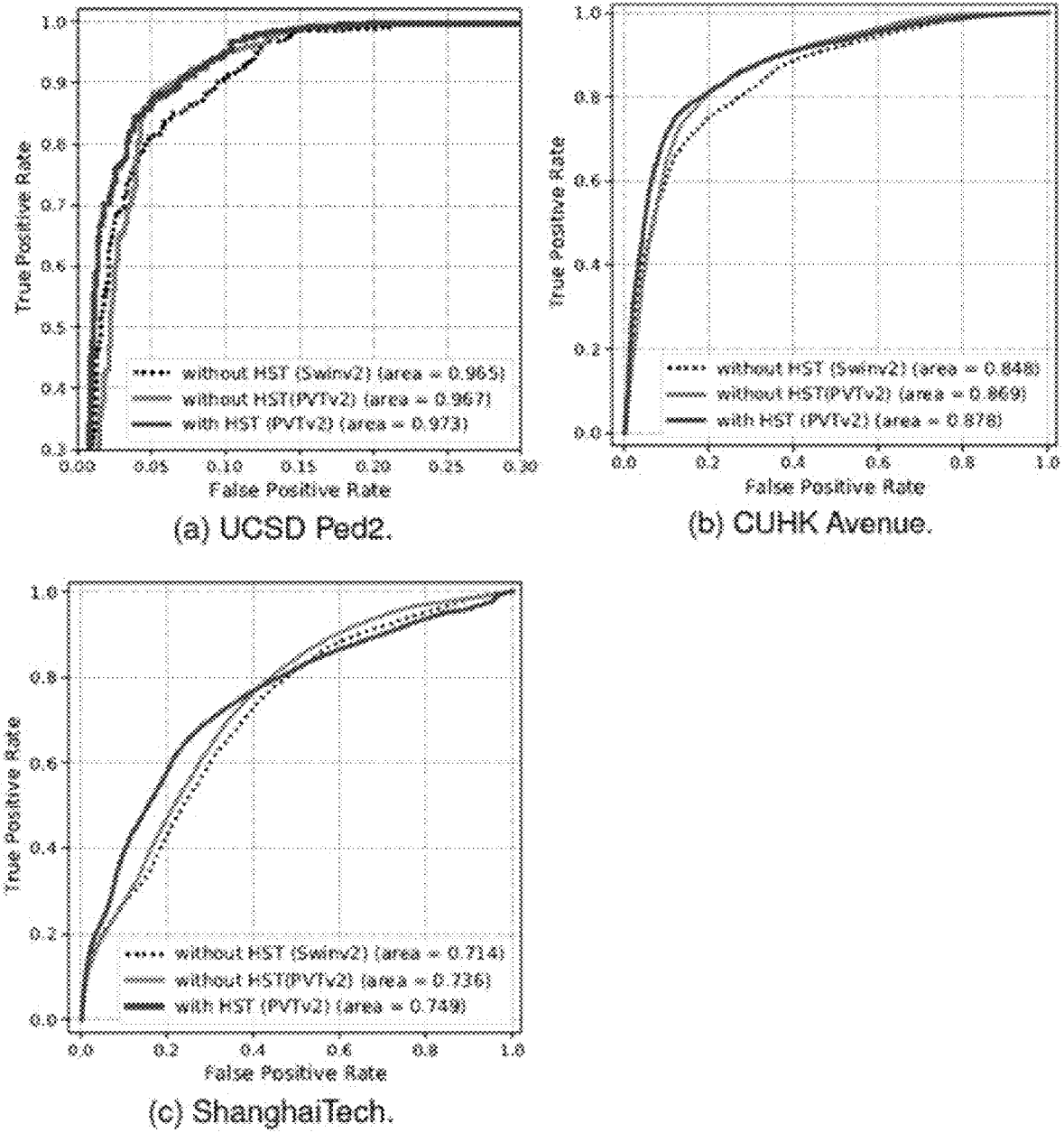
FIG. 6 is a diagram illustrating a comparison of receiver operating characteristic (ROC) curve results in the related art and an exemplary embodiment of the present disclosure.

FIG. 5 is a flowchart illustrating a transformer-based anomaly detection method according to an exemplary embodiment of the present disclosure, FIG. 6 is a diagram illustrating a comparison of receiver operating characteristic (ROC) curve results in the related art and an exemplary embodiment of the present disclosure, and FIG. 7 is a diagram illustrating a comparison of Area Under the Curve (AUC) curve results in the related art and an exemplary embodiment of the present disclosure.

In step 510, the anomaly detection apparatus 100 includes n encoding blocks having a pyramid structure, and extracts respective multi-scale feature maps having the pyramid structure through respective encoding blocks.

In step 515, the anomaly detection apparatus 100 has n spatio-temporal transformers, and generates each multi-scale spatio-temporal attention map in which the temporal feature and the spatial feature for the feature map extracted from each encoding block is emphasized through each spatio-temporal transformer.

In step 520, the anomaly detection apparatus 100 includes n decoders having the reverse pyramid structure, and generates the prediction frame by using the multi-scale spatio-temporal attention map and the output of the previous layer decoder through n decoders.

In step 525, the anomaly detection apparatus 100 calculates the abnormal score for the prediction frame, and detects the abnormal event by using the abnormal score.

FIG. 6 is a diagram illustrating a comparison of ROC curve results in the related art and an exemplary embodiment of the present disclosure and FIG. 7 is a diagram illustrating a comparison of AUC curve results in the related art and an exemplary embodiment of the present disclosure.

As illustrated in FIGS. 6 and 7, it can be seen that the performance is better as a result of applying the spatio-temporal transformer.

FIGS. 8A to 8G are a diagram illustrated to describe anomaly detection in drone image data according to an exemplary embodiment of the present disclosure. In FIGS. 8A to 8G, a left side indicates a normal frame, a center indicates an abnormal frame, and a right side indicates a prediction error.

Figure 8A:
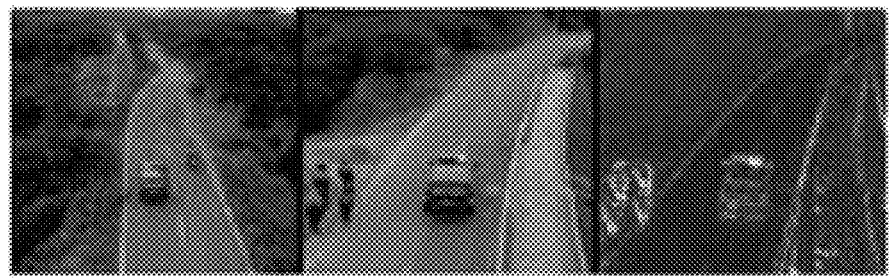
FIGS. 8A to 8G are a diagram illustrated to describe anomaly detection in drone image data according to an exemplary embodiment of the present disclosure.
Figure 8B:
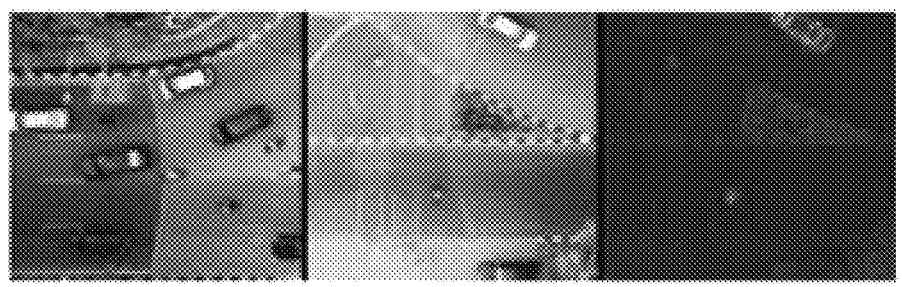
Figure 8C:

FIG. 8A illustrates a situation of detecting an anomaly in which cows invade a highway on the highway, FIG. 8B illustrates detection of a situation in which one man jaywalks, and FIG. 8C illustrates a result of detecting an anomaly in which a large bus invades a bike road. Further, FIG. 8D illustrates an anomaly detection result in which one person crosses a crossroad recklessly, FIG. 8E illustrates a result of detecting any object placed on a railway, FIG. 8F illustrates an anomaly detection result in which a part of a solar panel collapses, and FIG. 8G illustrates a result of detecting each anomaly in which a bike is detected at the center of a farmland.

Figure 8D:
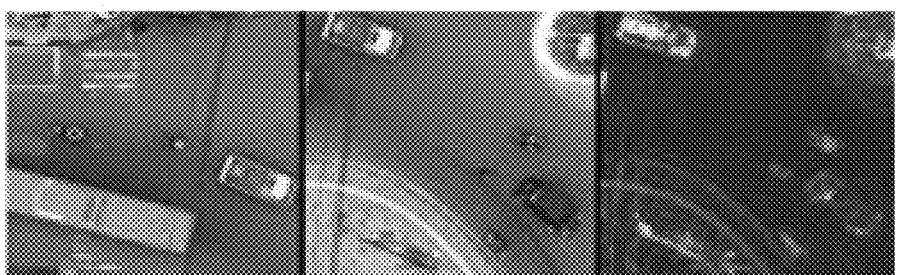
Figure 8E:
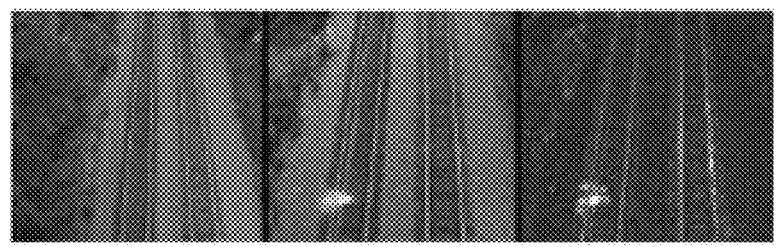
Figure 8F:
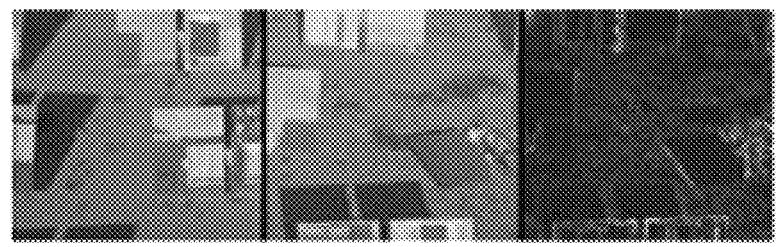
Figure 8G:
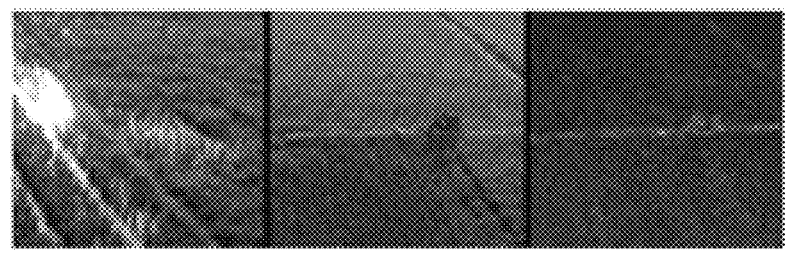
Figure 9:
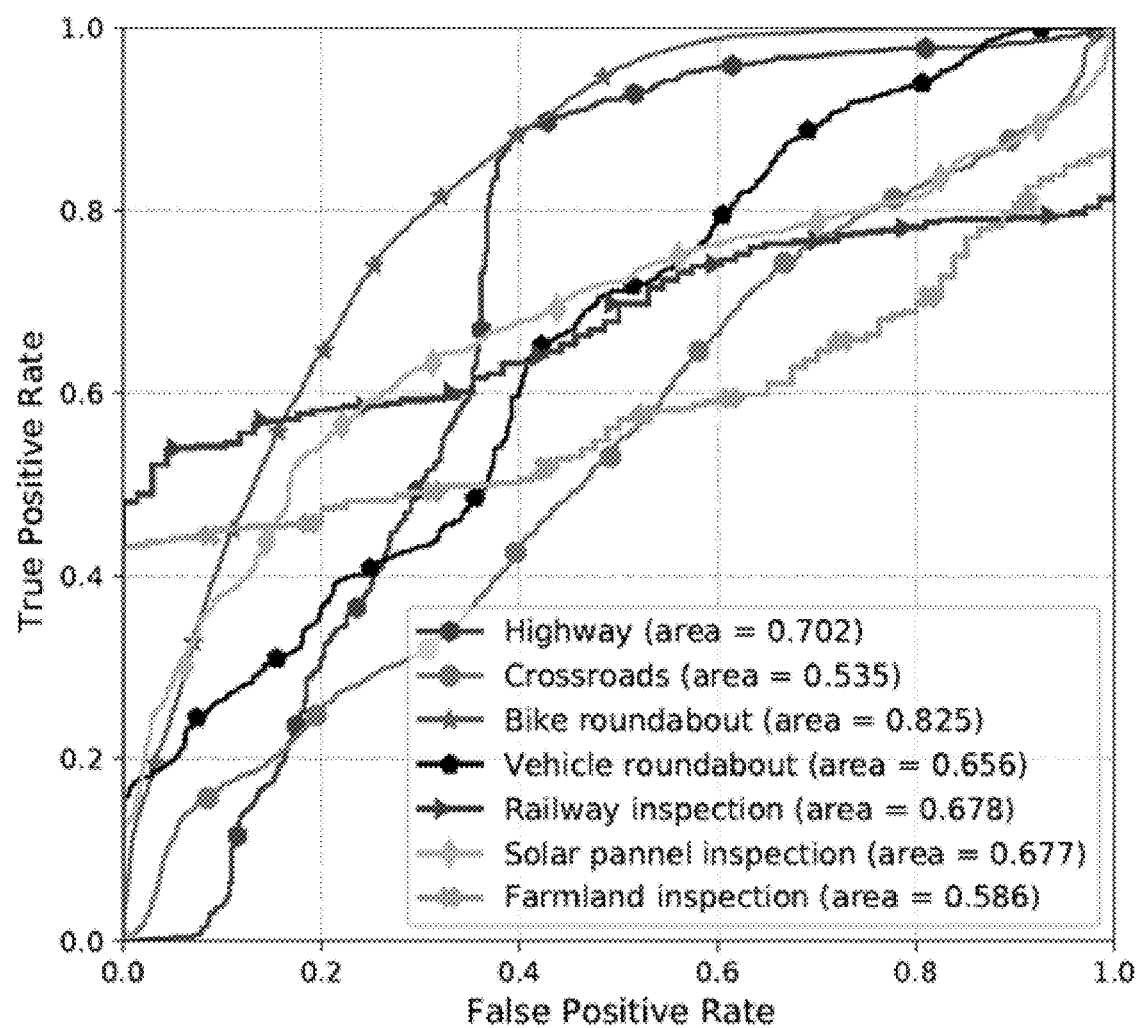
FIG. 9 is a diagram illustrating the ROC curve results in the related art and an exemplary embodiment of the present disclosure according to FIGS. 8A to 8G.

FIG. 9 illustrates an ROC curve for a drone image dataset of FIGS. 8A to 8G, and considering that various performances are shown from 0.535 to 0.825 in an entire scene, it can be seen that each scene has a unique spatio-temporal feature, and the anomaly detection apparatus according to an exemplary embodiment of the present disclosure may extract a better spatio-temporal feature.

FIG. 10 illustrates a result of comparing the related art and the performance by using the drone image data of FIGS. 8A to 8G, and as illustrated in FIG. 10, in the case of railway data of FIG. 8E, a result is shown in which the performance is more than the performance in the related art by 8.4% in terms of the AUC.

Further, in terms of the AUC, in the anomaly detection apparatus according to an exemplary embodiment of the present disclosure, the performance exceeds the performance in the related art ANDT in FIGS. 8A, 8C, and 8D.

In the case of the transformer-based anomaly detection apparatus according to an exemplary embodiment of the present disclosure, it can be seen that anomaly detection performance is better even not only in a general ground image but also in drone image data.

The apparatus and the method according to the exemplary embodiment of the present disclosure may be implemented in a form of a program command which may be performed through various computer means and recorded in the computer readable medium. The computer readable medium may include a program command, a data file, a data structure, etc., either alone or in combination. The program command recorded in the computer readable medium may be specially designed and configured for the present disclosure, or may be publicly known to and used by those skilled in the computer software field. An example of the computer readable recording medium includes magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program command. An example of the program command includes a high-level language code executable by a computer by using an interpreter and the like, as well as a machine language code created by a compiler.

The hardware device may be configured to be operated with one or more software modules in order to perform the operation of the present disclosure and vice versa.

So far, the present disclosure has been described based on the exemplary embodiments. Those skilled in the art to which the present disclosure pertains will be able to appreciate that the present disclosure can be implemented in a transformed form within a scope without departing from essential characteristics of the present disclosure. Therefore, the disclosed exemplary embodiments should be considered from a described point of view, not a limited point of view. The scope of the present disclosure is described in claims other than the description, and all differences within a scope equivalent thereto should be construed as being included in the present disclosure.

What is claimed is:

1. An anomaly detection apparatus comprising:
    an encoder unit including n encoding blocks having a pyramid structure, and extracting respective multi-scale feature maps having the pyramid structure through respective encoding blocks;
    a spatio-temporal transformer unit having n spatio-temporal transformers, and generating each multi-scale spatio-temporal attention map in which a temporal feature and a spatial feature for the feature map extracted from each encoding block are emphasized through each spatio-temporal transformer; and
    a decoder unit including n decoders having a reverse pyramid structure, and generating a prediction frame by using outputs of the multi-scale spatio-temporal attention map and a previous layer decoder through n decoders,
    wherein an abnormal event is detected by using the prediction frame.

2. The anomaly detection apparatus of claim 1, wherein the n-th decoder combines a result of upsampling the decoder output of the previous layer and a n-th spatio-temporal attention map output from the n-th spatio-temporal transformer, and then applies a convolution layer.

3. The anomaly detection apparatus of claim 1, wherein the n-th transformer comprises:
    a temporal self-attention module receiving the n-th feature map output from the n-th encoder, and then comparing patches having the same spatial location in different frames to generate a temporal attention map; and
    a spatial self-attention module positioned at a rear end of the temporal self-attention module, and generating a spatial attention map by using an output of the temporal self-attention module, and
    the temporal attention map and the spatial attention map are added to generate the n-th spatio-temporal attention map.

4. The anomaly detection apparatus of claim 3, wherein the spatial self-attention module applies a spatial reduction by using a spatial-reduction layer before applying a spatial self-attention.

5. The anomaly detection apparatus of claim 3, wherein the n-th spatio-temporal attention map is transferred to the decoder through a feed-forward network module, and a layer norm (LN) is applied to the n-th spatio-temporal attention map, which is transferred to the feed-forward network module.

6. An anomaly detection method comprising:
    (a) including n encoding blocks having a pyramid structure, and extracting respective multi-scale feature maps having the pyramid structure through respective encoding blocks;
    (b) having n spatio-temporal transformers, and generating each multi-scale spatio-temporal attention map in which a temporal feature and a spatial feature for the feature map extracted from each encoding block are emphasized through each spatio-temporal transformer; and
    (c) including n decoders having a reverse pyramid structure, and generating a prediction frame by using outputs of the multi-scale spatio-temporal attention map and a previous layer decoder through n decoders; and
    calculating a score by using the prediction frame, and determining that there is an abnormal event when the score is equal to or more than a threshold value.

7. The anomaly detection method of claim 6, wherein the n-th decoder combines a result of upsampling the decoder output of the previous layer and a n-th spatio-temporal attention map output from the n-th spatio-temporal transformer, and then applies a convolution layer.

8. The anomaly detection method of claim 6, wherein the generating of the n-th spatio-temporal attention map includes
- receiving the n-th feature map output from the n-th encoder, and then comparing patches having the same spatial location in different frames to generate a temporal attention map; and
- being positioned at a rear end of the temporal self-attention module, and generating a spatial attention map by using an output of the temporal self-attention module; and
- generating the n-th spatio-temporal attention map by adding the temporal attention map and the spatial attention map.

9. A non-transitory computer readable recording medium having a program code for executing the method of claim 6, which is recorded therein.

\* \* \* \* \*